Sept. 25, 1945.  R. G. LE TOURNEAU  2,385,416
EXTENSIBLE AXLE ASSEMBLY
Filed May 1, 1944

Inventor
R. G. LeTourneau

Attorneys.

Patented Sept. 25, 1945

2,385,416

UNITED STATES PATENT OFFICE 2,385,416

EXTENSIBLE AXLE ASSEMBLY

Robert G. Le Tourneau, Peoria, Ill., assignor to R. G. Le Tourneau Inc., Stockton, Calif., a corporation of California Application May 1, 1944, Serial No. 533,515

7 Claims. (Cl. 301—1)

This invention relates to, and it is an object to provide, an extensible axle assembly for wheel-supported implements, whereby when extended said assembly assures greater lateral stability of the implement.

The present invention represents a modification of the wheel gauge adjustment shown in U. S. Patent No. 2,371,261 dated March 13, 1945.

While the present invention is particularly intended for use in connection with transversely spaced supporting wheels of a portable crane, such as shown in the above copending application, the invention is readily adaptable to other types of wheel supported implements.

A further object of this invention is to provide an extensible axle assembly which includes, between each of a transversely spaced pair of wheels and the adjacent corresponding end of a fixed axle housing, an axle threaded into the housing whereby rotation of said axle in one direction or the other causes extension or retraction thereof, respectively, relative to said housing, the wheel being journaled on the outer end of said axle, and novel means mounted in part on the wheel and in part on the axle arranged to couple the wheel to the axle in driving relation to the latter, said means normally being disengaged whereby the wheel turns free on said axle.

An additional object of the invention is to provide an extensible axle assembly, as in the preceding paragraph, in which said coupling means comprises a heavy-duty radial disc fixed on the axle between the wheel and adjacent end of the axle housing, and a holding screw threaded through the wheel parallel to but radially out from its axis in position to frictionally abut in locking engagement with said disc; there being a screw control hand wheel or the like on the outer end of the screw accessible from exteriorally of the ground engaging wheel.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
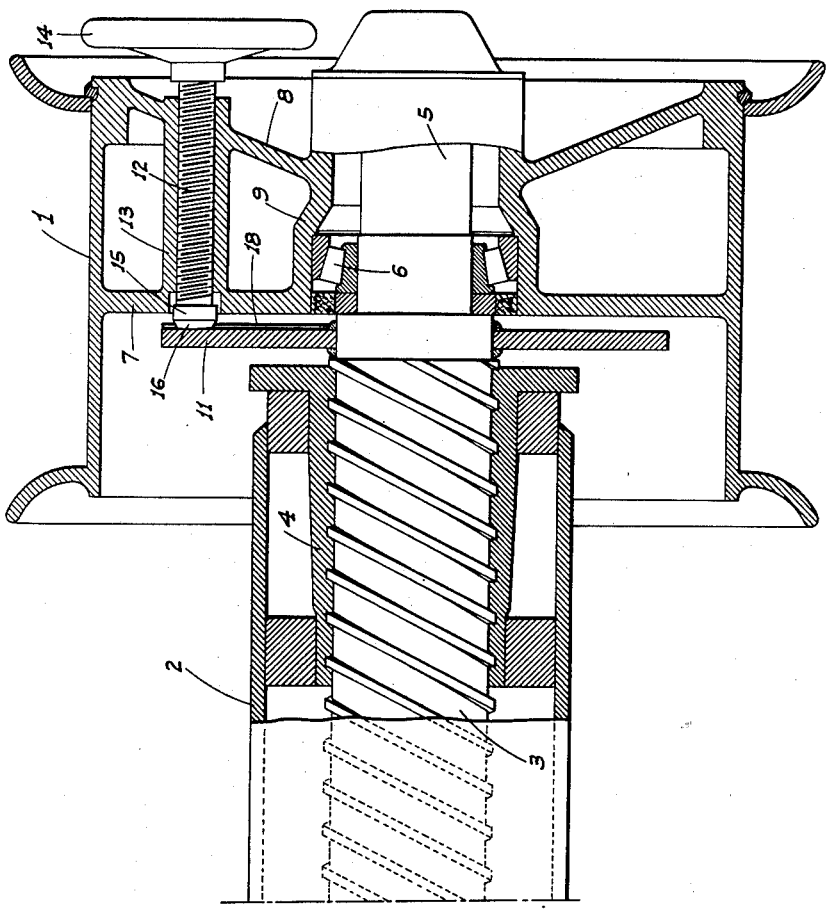
Figure 1 is a fragmentary sectional elevation, showing one axle and its wheel in retracted position.
Figure 2:
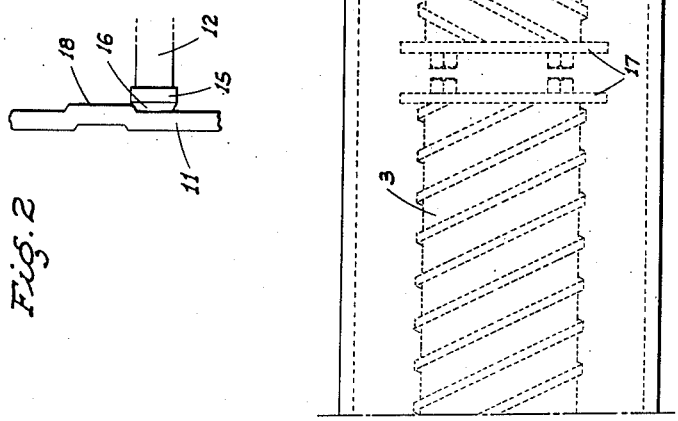
Figure 2 is a fragmentary elevation of the holding disc and the cooperating holding screw.

Referring now more particularly to the characters of reference on the drawing, the extensible axle assembly is adapted to be arranged in connection with a pair of transversely spaced ground engaging wheels 1 having a fixed transversely extending axle housing 2 therebetween. Separate axles 3 are disposed in the housing 2 in end to end alinement and project out of opposite ends thereof to support the corresponding wheel 1. Each axle 3 is threaded through an axially elongated supporting bushing 4 fixed in the corresponding end portion of the axle housing 2; said axles 3 being threaded oppositely relative to each other.

As the structure at each end of the extensible axle assembly is identical, only one end thereof is shown and described, for the purpose of brevity and clarity.

At its outer end each axle 3 is formed with a fixed spindle 5 on which the corresponding wheel 1 is rotatably mounted by bearing means shown in part at 6. The wheel 1 is of a type which includes an inner and an outer radial web, indicated at 7 and 8, respectively, which connect the wheel hub 9 with the rim 10.

The radial web 7 is disposed in clearance relation to the adjacent end of the bushing 4 when the axle 3 is retracted, as shown in Fig. 1. A heavy-duty annular disc 11 is fixed on the shaft 3 and extends in clearance relation between the radial web 7 and the adjacent end of the bushing 4; said disc being of substantial radial extent.

A screw 12 is threaded through a sleeve or boss 13 which extends between radial webs 7 and 8; said screw being parallel to the axis of the wheel 1 and disposed between the hub 9 and rim 10. At its outer end the screw 12 is provided with a hand wheel 14, while at its inner end said screw is fitted with a head 15 which may have a friction lining 16 on the working face thereof; said head being in position to engage the disc 11 when the screw 12 is run in by means of the hand wheel 14.

The above described extensible axle assembly is normally in a position with the axles retracted as shown in Fig. 1, and with the screw 12 set so that the head 15 and its lining 16 are clear of the disc 11. In this position of the parts, the wheels 1 are free to rotate on the spindles 5, while the axles 3 remain stationary; the drag of the threads being sufficient to prevent rotation of said axles.

When it is desired to extend the axles, and consequently to increase the gauge of the wheels 1, the screws 12 are run in until the friction lining of head 15 forcefully engages the adjacent face of the discs 11. Thereafter the implement which the wheels support is moved slowly in a direction to cause rotation of the axles 3 and resultant extension thereof. Extension of said axles 3 is limited by enlarged heads or plates 17 fixed on their inner ends, and which enlarged heads engage against the inner end of bushings 4 after the axles have extended a predetermined distance. In order to assure against slippage between the head 15 and the disc 11, the latter is formed with one or more radial shoulders 18 on the working face thereof. If any slippage occurs between the head 15 and disc 11, the shoulder 18 will be brought into abutment with said head 15 and prevent further relative movement between said head and disc.

The extensible axle assembly is retracted by merely reversing the above procedure.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An extensible axle assembly comprising a fixed axle housing, an axle threaded into said housing, a wheel journaled on the outer end of said axle, and releasable means to lock the wheel to the axle; said means including a radial disc fixed on the axle adjacent the wheel, and a movable holding element mounted on the wheel for movement lengthwise of its axis, said element being adapted to forcefully and frictionally engage the adjacent face of said disc.

2. An extensible axle assembly comprising a fixed axle housing, an axle threaded into said housing, a wheel journaled on the outer end of said axle, and releasable means to lock the wheel to the axle; said means including a radial disc fixed on the axle adjacent the wheel, a movable holding element mounted on the wheel for movement lengthwise of its axis, said element being adapted to forcefully and frictionally engage the adjacent face of said disc, and a stop element formed on said face of the disc.

3. An extensible axle assembly comprising a fixed axle housing, an axle threaded into said housing, a wheel journaled on the outer end of said axle, and releasable means to lock the wheel to the axle; said means including a radial disc fixed on the axle adjacent the wheel, a movable holding element mounted on the wheel for movement lengthwise of its axis, said element being adapted to forcefully and frictionally engage the adjacent face of said disc, and a radially extending stop shoulder formed on said face of the disc.

4. An extensible axle assembly comprising a fixed axle housing, an axle threaded into said housing, a wheel journaled on the outer end of said axle, and releasable means to lock the wheel to the axle; said means including a radial disc fixed on the axle adjacent the wheel, and a holding screw threaded through the wheel lengthwise of and radially out from its axis for engagement in holding relation with the adjacent face of said disc.

5. An extensible assembly comprising a fixed axle housing, an axle threaded into said housing, a wheel journaled on the outer end of said axle, and releasable means to lock the wheel to the axle; said means including a radial disc fixed on the axle adjacent the wheel, a holding screw threaded through the wheel lengthwise of and radially out from its axis for engagement in holding relation with the adjacent face of said disc, and a hand wheel on the screw at the end opposite the disc.

6. An extensible axle assembly as in claim 5 including a head on the disc engaging end of the screw, and a friction lining on the face of said head adjacent the disc.

7. An extensible axle assembly comprising a fixed axle housing, an axle threaded into said housing, a wheel journaled on the outer end of said axle, and releasable means to lock the wheel to the axle; such means including a radial disc fixed on the axle adjacent the wheel, a threaded sleeve mounted in the wheel in substantial parallelism with the wheel axis and extending to a point adjacent the outer face of the wheel, a screw threaded through the sleeve, a head on the screw adapted, upon turning of the screw, to be carried into frictional engagement with the disc in any relative position assumed by the wheel with respect to the disc, and means for turning the screw.

ROBERT G. LE TOURNEAU.